Nov. 11, 1969   C. J. HIRSCH   3,478,360
CONVERTER FOR VHF-OMNIRANGE (VOR) RECEIVER
Filed July 22, 1968   3 Sheets-Sheet 1
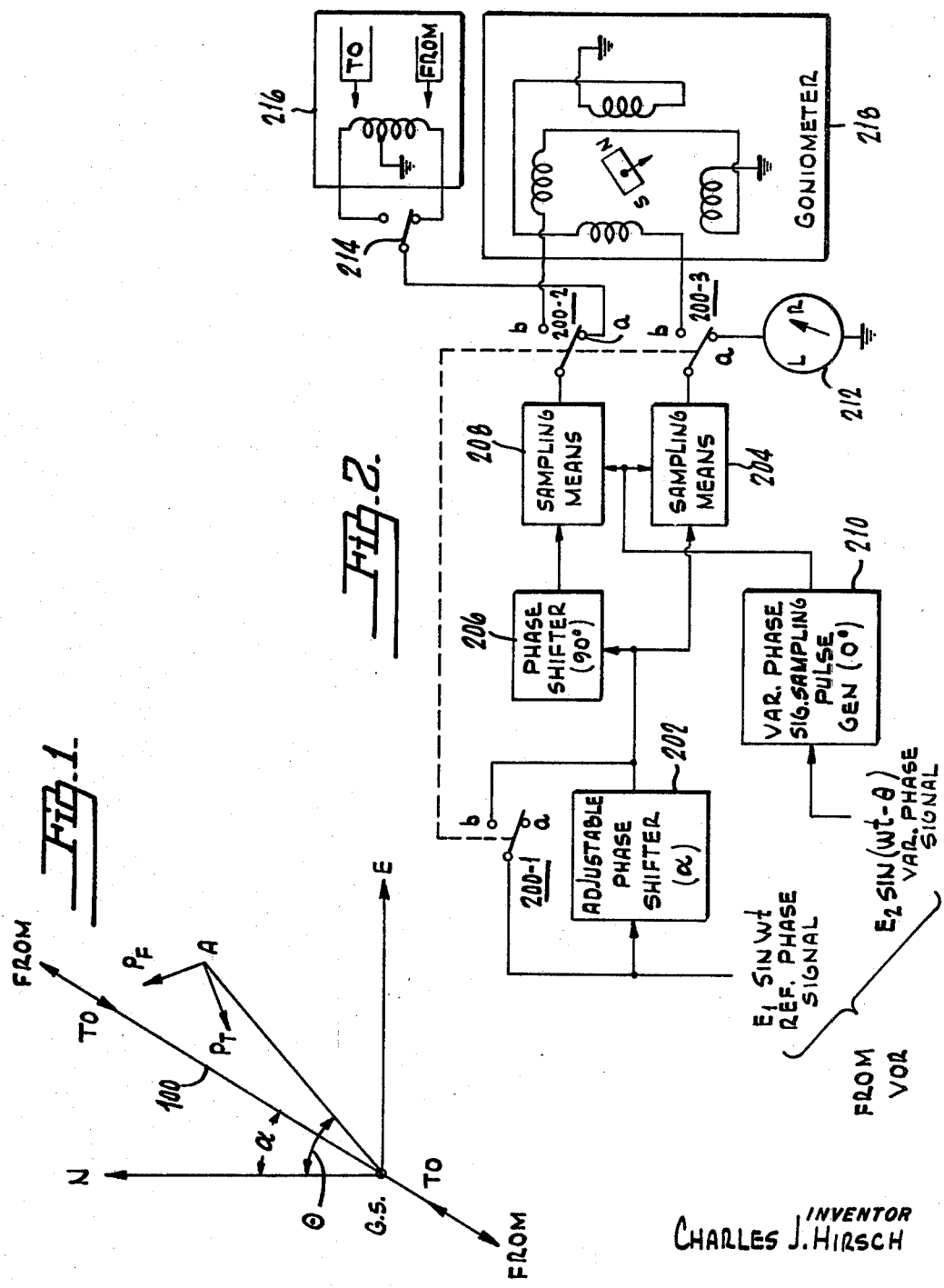
INVENTOR
CHARLES J. HIRSCH
BY George J. Seligsohn
ATTORNEY

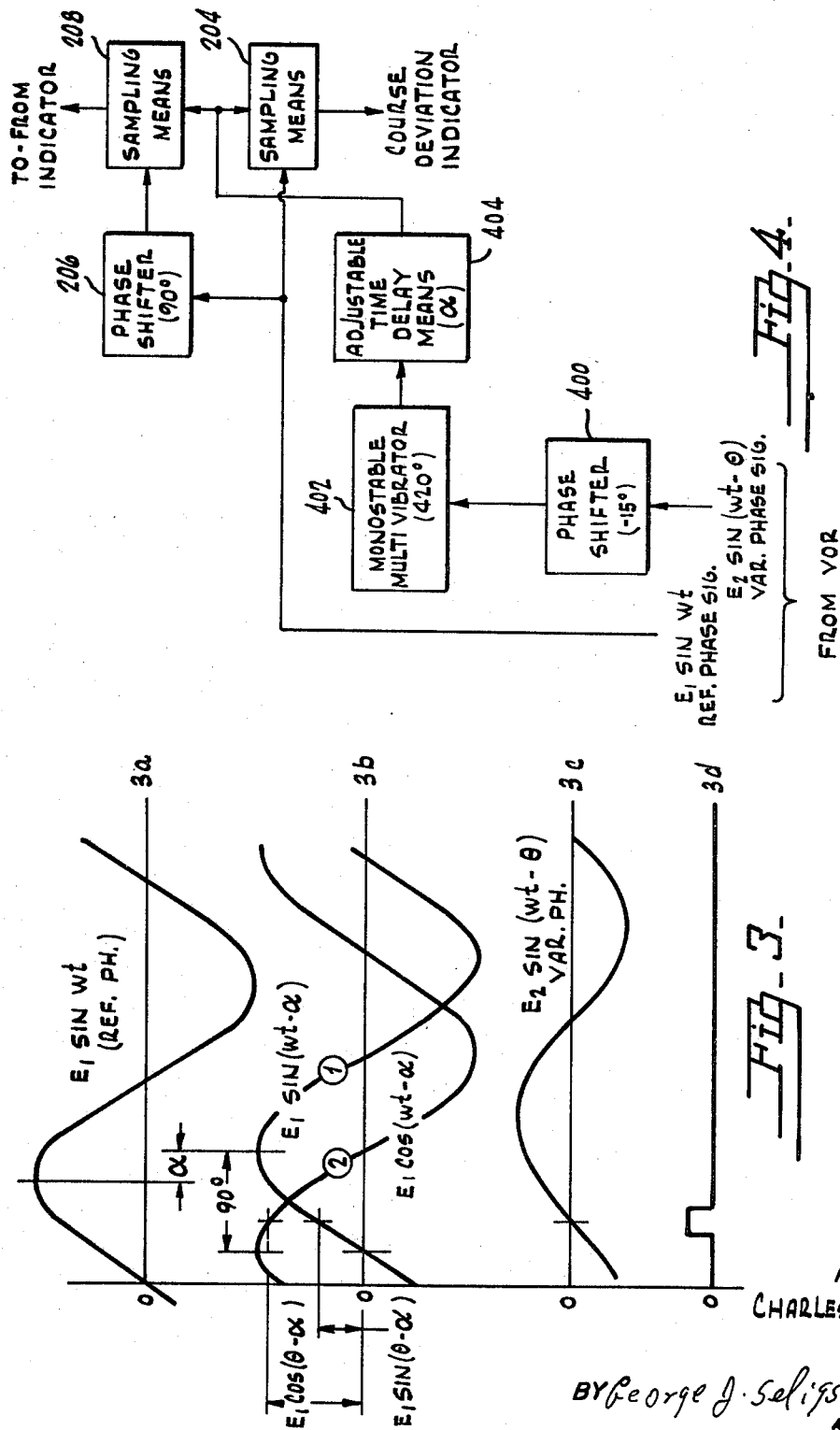

INVENTOR
CHARLES J. HIRSCH
BY George J. Seligsohn
ATTORNEY

United States Patent Office 3,478,360
Patented Nov. 11, 1969

3,478,360
CONVERTER FOR VHF-OMNIRANGE (VOR) RECEIVER
Charles J. Hirsch, Princeton, N.J., assignor to RCA Corporation, a corporation of Delaware
Filed July 22, 1968, Ser. No. 746,551
Int. Cl. G01s 1/44
U.S. Cl. 343—106        13 Claims

ABSTRACT OF THE DISCLOSURE

By utilizing the phase of one of the two 30 hertz outputs of a VOR to control the time of sampling of 30 hertz signals derived from the other output of the VOR, DC signals having a fixed magnitude and polarity between successive samplings are obtained which manifest the relative phase information between the VOR output signals, while eliminating the sinusoidal time-varying property exhibited by these VOR output signals. Aircraft bearing information may be presented to the pilot either by applying these samples to a course deviation indicator and a "TO-FROM" polarity indicator and/or by applying these samples to a goniometer.

---

This invention relates to air navigation equipment and, more particularly, to an improved converter for use in presenting to the pilot of an aircraft bearing information from a VOR.

VHF-omnirange (VOR) is one of the most useful and widespread navigation devices. It supplies the azimuth in degrees from North, of an aircraft with respect to a preselected one of a plurality of VOR ground stations which are distributed over the country at known predetermined locations.

Each VOR station, which is assigned a given 50 kHz. channel within the 108.0 to 117.9 mHz. frequency band, emits two RF signals, which are separated by 9960 hertz in frequency. One of these signals, which is called the "reference-phase" signal, is frequency modulated at 30 hertz and radiated by an omni-directional antenna, so that it is received with the same phase at all points which are equi-distant from the antenna. The other of these signals, which is called the "variable-phase" signal, is not modulated at the transmitter, but is radiated from a directional antenna with a cardioid pattern which pattern is rotated at the rate of 30 revolutions per second. This directional antenna is concentric with the omni-directional antenna which radiates the "reference-phase" signal. The received "variable-phase" signal, at any point in space, will be amplitude-modulated at 30 hertz because of the rotation of the cardioid pattern at 30 revolutions per second. The phase of this received 30 hertz amplitude-modulated signal at any azimuth will differ from the phase thereof at any other azimuth by the difference in the azimuth of the two places. The 30 hertz frequency modulation of the "reference-phase" signal is synchronized with the 30 r.p.s. of the cardioid pattern of the "variable-phase" signal so that the received 30 hertz amplitude-modulated "variable-phase" signal will coincide with the received 30 hertz frequency-modulated "reference-phase" signal solely in the due North direction with respect to the transmitting ground station. In any other direction, these two signals will differ in phase by an amount equal to the azimuth of that direction with respect to the transmitting ground station.

A VOR receiver aboard an aircraft receives the two RF signals transmitted from a particular ground station to which it is tuned and demodulated these two RF signals to provide at its output a first 30 hertz signal having a phase which manifests the "reference-phase" and a second 30 hertz signal having a phase which manifests the "variable-phase."

In order for the pilot of an aircraft to make use of the direction information manifested by the relative phase of the two 30 hertz output signals from the VOR receiver, it is necessary to provide some form of converter responsive to these two output signals from the VOR receiver for presentation to the pilot. In the past, such converters have been relatively complex and costly. This relatively high cost has made it impractical to utilize VOR to any great extent with smaller general aviation aircraft. The present invention is directed to a converter for a VOR receiver that is considerably simpler and less costly than VOR converters presently available, which makes it practical to extend the benefits of VOR navigation equipment to small general aviation aircraft.

Briefly, the present invention makes use of phase shifting and sampling of the 30 hertz output signals from the VOR receiver in a manner such as to eliminate the sinusoidal time-varying property exhibited by these signals while preserving the relative phase information contained therein.

It is therefore an object of the present invention to provide an improved converter for a VHF-omnirange (VOR) receiver.

This and other objects, features and advantages of the present invention will become more apparent from the following detailed description taken together with the accompanying drawings in which:

FIG. 1 is a coordinate plot illustrating an actual position of an aircraft with respect to a ground station and a desired course line for the aircraft with respect to the ground station;

FIG. 2 is an illustrative block diagram of one embodiment of a converter employing the present invention;

FIG. 3 shows a plurality of signal function graphs which are helpful in understanding the operation of the embodiment of the present invention shown in FIG. 2;

FIG. 4 is a block diagram of a modification of the embodiment of the present invention shown in FIG. 2;

Figure 5:
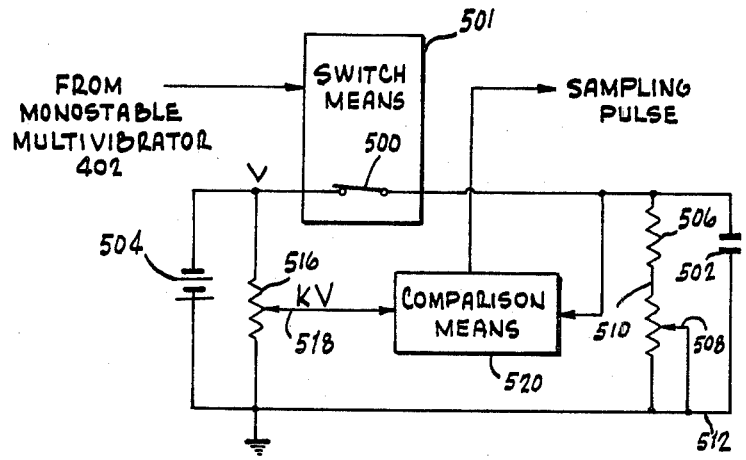
FIG. 5 is a block and schematic diagram of an inexpensive variable time delay means particularly suitable for providing an adjustable phase shift in the modification of FIG. 4.

Referring now to FIG. 1, G.S. represents the location of a ground station, which is located at the origin of the coordinate plot defined by the N or North coordinate and E or East coordinate. Point A represents the actual position at a given time of an aircraft having a VOR receiver on board with respect to the ground station. As shown, the azimuth relative to north of aircraft A with respect to the ground station is $\theta$. The desired course line 100 of aircraft A with respect to the ground station has, as shown, an azimuth $\alpha$ relative to north. If the desired direction of aircraft A along course line 100 is away from the ground station, it will be moving in the "FROM" direction. On the other hand, if the desired direction of aircraft A along the course line is toward the ground station, it will be moving in the "TO" direction. In order for aircraft A to reach course line 100 when it is flying in the "FROM" direction, it will have to first travel in a direction such as shown by vector $P_F$. On the other hand, in order for aircraft A to reach course line 100 when it is flying in the "TO" direction, it will have to first travel in a direction such as shown by vector $P_T$.

Referring now to FIG. 2, for illustrative purposes there is shown ganged single-pole double-throw switches 200–1, 200–2, and 200–3, each having an *a* switch condition and a *b* switch condition. In response to switches 200–1, 200–2, and 200–3 being in their *a* switch condition, a first type of presentation display of the aircraft azimuth with respect to the ground station is supplied to the pilot, while in response to switches 200–1, 200–2, and 200–3 being in their *b* switch condition, an alternative second type of presentation display of the aircraft azimuth with respect to the ground station is supplied to the pilot.

Considering now the first type of presentation display, with ganged switches 200–1, 200–2 and 200–3 in their *a* switch condition, a first signal output from the VOR receiver, which is a 30 hertz sine wave having the reference phase sin $\omega t$, shown in FIG. 3a, is applied as an input to adjustable phase shifter 202. $\omega$ is the angular velocity, equal to $2\pi$ times the frequency, 30 hertz, of the sine wave, and $t$ is equal to time with respect to a zero crossing of the "reference-phase" signal. Phase shifter 202 is adjusted to phase shift in the negative sense the input applied thereto by $\alpha$ degrees, the known azimuth of the desired course line shown in FIG. 1, so that the output from adjustable phase shifter 202 is $E_1 \sin (\omega t - \alpha)$, shown in curve 1 of FIG. 3b. The output from adjustable phase-shifter 202 is applied as an input to sampling means 204 and also as an input to 90° phase shifter 206. The output from phase shifter 206, which is shown in curve 2 of FIG. 3b and is $E_1 \cos (\omega t - \alpha)$ is applied as an input to sampling means 208.

Each of sampling means 204 and 208 includes normally open switch means for sampling the instantaneous level of the input applied thereto in response to the closing of the switch means and, preferably, also includes means for storing the sample level until the next sampling. For instance, the switching means of each of sampling means 204 and 208 may comprise a conventional diode quad and the storing means may include a conventional integrating operational amplifier. Another example of a switching means and storing means that can be made inexpensively as an integrated circuit is an MOS FET circuit which takes advantage of the extremely high input impedance of MOS field effect transistors in their cutoff condition for storing the sampled signal between samplings.

The variable phase output signal from the VOR, which is designated by the function $E_2 \sin (\omega t - \theta)$ shown in FIG. 3c, is applied as an input to sampling pulse generator 210. Generator 210 includes a limiter and differentiator circuit for producing a sampling pulse output, shown in FIG. 3d, in response to each positive-going zero crossover of the variable phase signal applied as an input thereto. The sampling pulse output from generator 210 is applied as a control signal to each of sampling means 204 and 208 to effect the samipling of the instantaneous level of the sinusoidal wave signal then being applied thereto from phase shifters 202 and 206, respectively.

The output of sampling means 204, which is a D.C. signal having a level and polarity dependent upon the relative values of $\theta$ and $\alpha$, is applied through switch 200–3 when in its *a* switched condition to course deviation indicator (C.D.I.), which is a D.C. meter, 212. The output of sampling means 208, which is a D.C. signal having a level and polarity dependent upon the relative values of $\theta$ and $\alpha$, is applied through switch 200–2 when in its *a* switched condition 214. "TO–FROM" switch 214 is a manual switch which is placed in a certain one of its switched conditions when the arcraft is traveling in a generally North to South direction, i.e., from the first or second quadrant toward the third or fourth quadrant, and is placed in its other switch condition when the aircraft is traveling in a generally South to North direction, i.e., from the third or fourth quadrant toward the first or second quadrant. The fixed terminals of "TO–FROM" switch 214 are connected to D.C. polarity indicator 216 which causes either a "TO" or a "FROM" flag to be displayed as a function of both the polarity of the signal output from sampling means 208 and the switch condition of "TO–FROM" switch 214.

By flying that course which causes the readout manifested by 212 to be reduced to zero and then be maintained at zero a flight path along course line 100 can be achieved. The flag displayed by indicator 216 will be "TO" if the aircraft is approaching the ground station and will be "FROM" if the aircraft is retreating from the ground station.

When ganged switches 200–1, 200–2 and 200–3 are placed in their "*b*" switch condition, adjustable phase shifter 202 is eliminated from the circuit and the output from sampling means 204 ($E_1 \sin \theta$) is applied to the vertical coils of goniometer 218, which is utilized as an omni-bearing indicator (OBI), and the output of sampling means 208 is ($E_1 \cos \theta$) applied to the horizontal coils of goniometer 218. The indicator of goniometer 218 will then be rotated to a position where the pilot can directly read the azimuth of the aircraft with respect to the ground station, which information can be used by him in navigating any desired course. Although goniometer 218 is shown as a D.C. instrument to the quadratured D.C. voltages $E_1 \sin \theta$ and $E_1 \cos \theta$ are fed. If preferred, these voltages can be used to amplitude modulate an A.C. carrier, thereby permitting the use of A.C. synchro indicators.

Referring now to FIG. 4, there is shown a modification of the embodiment of FIG. 2 utilizing the first type of presentation display, discussed above. In FIG. 4, sampling means 204, phase shifter 206 and sampling means 208 are identical in structure and function to the corresponding blocks of FIG. 2. The output of sampling means 204 is coupled to a CDI and the output of sampling means 208 is coupled to a "TO-FROM" indicator, just as is the case in FIG. 2 when ganged switches 200–2 and 200–3 are in their *a* switch condition. However, in FIG. 4 adjustable phase shifter 202 of FIG. 2 is eliminated and sampling pulse generator 210 of FIG. 2 is replaced by phase shifter 400, multivibrator 402 and adjustable time delay means 404.

Figure 6:
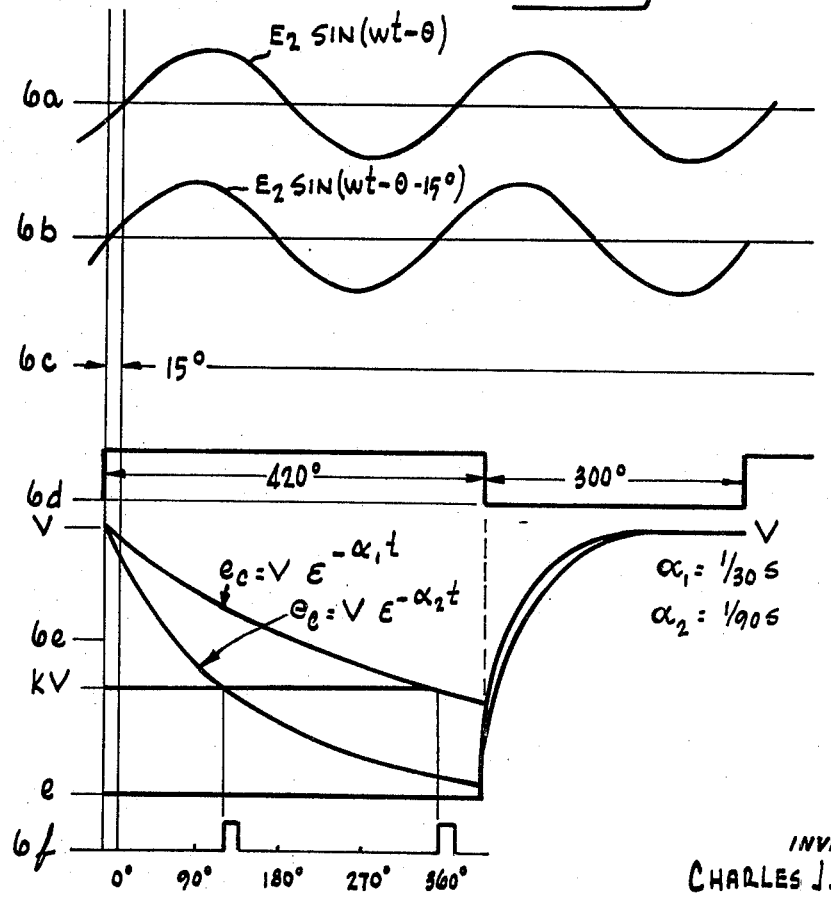
FIG. 6 shows a plurality of signal function graphs which are helpful in understanding the operation of the embodiment of the present invention shown in FIGS. 4 and 5.

More specifically, as shown in FIG. 4, the reference-phase sinusoidal output signal from the VOR is applied directly at an input to sampling means 204 and as an input to phase shifter 206. The variable phase sinusoidal output signal from the the VOR is applied as an input to phase shifter 400, which shifts the phase of the signal output therefrom with respect to the signal input thereto in a negative direction by a fixed certain angle, such as 15 degrees. The input to phase shifter 400 is shown in FIG. 6a and the output from phase shifter 400 is shown in FIG. 6b. They differ in phase with respect to each other by 15 degrees, as shown in FIG. 6c.

The output from phase shifter 400 is applied as an input to monostable multivibrator 402, which in response thereto, produces a control pulse having its leading edge in time coincidence with the zero degree crossover of the output from phase shifter 400. This control pulse has a fixed certain duration, such as 420 degrees, which, as shown in FIG. 6d is greater than one and less than two periods of the sinusoidal output signals from the VOR. Control pulses from monostable multivibrator 402 are applied as an input to adjustable time delay means 404 which, as will be described in more detail below, produces a sampling pulse as an output therefrom after a time delay $\alpha$ which can be adjusted from a minimum value equal to the phase shift provided by phase shifter 400 to a maximum value which exceeds this minimum value by at least 360 degrees, but which is less than the duration of a control pulse. Sampling pulses from adjustable time delay means 404 are applied as a control signal to sampling means 204 and 208 in the same manner as previously described in connection with FIG. 2.

A circuit which is particularly suitable for use as time delay means 404, and which may utilize integrated circuitry to a large extent, is shown in FIG. 5. An electronic switch, which is shown schematically as element 500, of switch means 501 is effective when closed in providing a charging circuit having a short time constant while charging capacitance 502 to the voltage V of DC voltage source 504. Capacitance 502 is provided with a discharge circuit consisting of linearly adjustable resistance 506 which may be varied from a minimum value thereof when wiper 508 is adjusted to point 510 to a maximum value thereof when wiper 508 is adjusted to ground point 512. However, so long as switch 500 is closed this discharge circuit is without effect and capacitance 502 remains charged to voltage V. Switch 500 of switch means 501 is normally closed, but is opened during the existence of each control pulse applied as an input thereto from monostable multivibrator 402. Capacitance 502 discharges through resistance 506 while switch 500 is opened. As will become more apparent later, the leading edge of each control pulse applied to switch means 501 acts as a start signal which initiates a time delay interval.

Connected across voltage source 504 is adjustable voltage divider 516 having a movable tap 518 connected as a first input to comparison means 520. The voltage across capacitance 502 is applied as a second input to comparison means 520. Comparison means 520, which may be a differential amplifier for instance, produces an output pulse in response to the potential at its first and second inputs being equal to each other. The output pulse from comparison means 520 is utilized as the sampling pulse output of the adjustable time delay means.

Considering now the operation of the adjustable time delay means shown in FIG. 5, at the time switch 500 is opened in response to a control pulse being applied to switch means 501 from monostable multivibrator 402, capacitance 502 has already been charged to its maximum voltage V. Therefore, the potential at the second input of comparison means 520 will then be higher than the potential applied to the first input of comparison means 520 from movable tap 518 of voltage divider 516. However, in response to the opening of switch 500, capacitance 502 begins to discharge through resistance 506 at a rate which is determined by the resistance value to which linearly adjustable resistance 506 is then adjusted. When capacitance 502 has discharged to that point where the respective potentials of the first and second inputs to comparison means 520 are equal to each other, an output pulse from comparison means 520 will be applied as a sampling pulse to sampling means 204 and 208 of FIG. 4. Capacitance 502 will continue to be discharged through resistance 506 until the termination of the control pulse then being applied to switch means 501. In response to the termination of this control pulse, however, switch 500 of switch means 501 is closed, causing capacitance 502 to again be charged up to its maximum voltage V before the application of the next-occurring control pulse to switch means 501.

It will be seen that the time between the occurrence of a start signal, manifested by the leading edge of a control pulse, and the next-occurring sampling pulse obtained from the output of comparison means 520 depends both on the setting of movable tap 518 of voltage divider 516 and the setting of wiper 508 of linearly adjustable resistance 506 It is essential that the time delay between the sampling pulse and the start signal be continuously variable over an interval at least equal to one period of the output signals from the VOR, i.e., 1/30 of a second. At the same time it is essential that the minimum resistance to which resistance 506 can be adjusted is sufficiently high as not to short circuit capacitance 502 and thereby prevent capacitance 502 from being charged to voltage V. Therefore, there has to be some minimum time delay between the occurrence of a start signal and the occurrence of a sampling pulse in response thereto which is greater than zero. This minimum time delay is made to be just equal and opposite to the phase shift of the variable phase signal provided by phase shifter 400, i.e., 1/720 of a second or 15 degrees of the output sinusoidal signals obtained from the VOR. This is accomplished by adjusting wiper 508 to point 510 to provide linearly variable resistance 506 with its predetermined minimum resistance. Then, movable top 518 of voltage divider 516 is adjusted to that point at which the time delay between the occurrence of a start signal manifested by the leading edge of a control pulse and the occurrence of a sampling pulse in response thereto is exactly equal to the required minimum time delay.

The maximum value of resistance 506 is such that when wiper 508 is adjusted to ground point 512 a maximum time delay will be obtained which exceeds the minimum time delay by at least 360 degrees, or 1/30 of a second of the output signal obtained from the VOR, but is less than the duration of a control pulse, i.e., 420 degrees in the illustrative example shown in FIG. 6d. The position of wiper 508 of linearly adjustable resistance 506 is manually controlled by a knob which is calibrated in degrees of phase angle over an interval of at least 360 degrees.

FIG. 6e shows the discharging characteristics of capacitance 502 during the presence of a control pulse and the charging characteristics of capacitance 502 during the absence of a control pulse for two different settings of wiper 508 of adjustable resistance 506. FIG. 6f shows the relative time of occurrence of a sampling pulse for each of these two different settings of wiper 508 of adjustable resistance 506.

The sampling techniques employed by the present invention provide a means, which is independent of the relative amplitude ($E_1/E_2$) of the reference phase signal to the variable phase signal, for utilizing the phase information in the two outputs from the VOR, while eliminating the 30 hertz "carrier" of this information. This greatly increases the overall simplicity of the converter and results in an appreciable cost reduction.

What is claimed is:

1. In an aircraft navigation system, a converter for use with a VHF-omnirange receiver aboard an aircraft which receiver in response to received radio signals transmitted from a ground station supplies first and second separate output signals that vary substantially sinusoidally in time at the same given frequency, said first signal having a reference phase and said second signal having a variable given phase with respect to said reference phase which depends on the then-existing azimuth of said aircraft with respect to said ground station; said converter comprising first means responsive to one of said first and second signals being applied thereto for deriving a third signal which varies substantially sinusoidally in time and has a predetermined phase with respect to the phase of said one of said first and second signals and a fourth signal which varies substantially sinusoidally in time and has a phase which is in quadrature with said predetermined phase, second means responsive to the other of said first and second signals being applied thereto for deriving a sampling pulse when a preselected angular value of said other of said first and second signals occurs, third means coupled to said first and second means for repectively sampling the then-existing instantaneous amplitude of said respective third and fourth signals in response to the occurrence of a sampling pulse, and fourth means coupled to said third means and responsive to the magnitude and polarity of said samples of said third and fourth signals for manifesting information pertaining to the angular orientaiton of said aircraft with respect to said ground station.

2. The converter defined in claim 1, wherein said fourth means includes a D.C. meter for indicating the magnitude and polarity of a signal applied thereto, means for applying said samples of a certain one of said third and foutrh signals to said D.C. meter, a two-throw switchable "TO–FROM" polarity indicator for indicating "TO" or "FROM" in accordance with its switch state and the polarity of a signal applied thereto, and means for applying said samples of the other of said third and fourth signals to said polarity indicator.

3. The convert defined in claim 2, wherein said first means includes an adjustable phase shifter for providing a preselected phase shift between said predetermined phase of said third signal and the phase of said one of said first and second signals.

4. The converter defined in claim 3 wherein said adjustable phase shifter is manually controllable.

5. The converter defined in claim 2, wherein said second means includes a control pulse generator for generating a start signal in response to the other of said first and second signals having a predetermined phase, and an adjustable time delay means coupled to said pulse generator for generating said sampling pulse a preselected time after the occurrence of said start signal.

6. The converter defined in claim 5, wherein said start signal is the leading edge of a control pulse generated by said generator, said control pulse having a duration greater than one period of said first and second signals, and wherein said time delay means includes first and second terminals adapted to be connected to a source of fixed voltage, voltage divider resistance means having one end thereof connected to said first terminal and the other end thereof connected to said second terminal, a given capacitance, a charging circuit for said capacitance including a pulse controlled switch means for connecting said capacitance across said first and second terminals only when said switch means is in a closed position, a discharging circuit for said capacitance including a linearly-adjustable resistance having a predetermined maximum value and a predetermined minimum value connected in parallel with said capacitance, said switch means having a control pulse applied thereto for effecting the switching thereof from a closed position to an open position during the occurrence of an applied control pulse, and comparison means having a first input thereof connected to a point of said voltage divider resistance means intermediate the ends thereof, said comparison means having a second input thereof connected to said charged capacitance for generating said sampling pulse in response to the potential difference between said first and second inputs of said comparison means reaching a predetermined value during the discharge of said capacitance.

7. The converter defined in claim 6, wherein said point of said voltage divider resistance means is chosen so that said time delay means provides a first given time delay which is less than the duration of said control pulse when said adjustable resistance has its predetermined maximum resistance and a second given time delay when said adjustable resistance has its predetermined minimum resistance, said first given time delay exceeding said second given time delay by at least the duration of one period of said first and second signals, and wherein said adjustable resistance includes adjusting means calibrated in terms of phase angle with respect to the phase of said start signal.

8. The converter defined in claim 7, wherein said control pulse generator comprises fixed phase shift means for shifting the phase of said other of said first and second signals by an amount equal and opposite to the phase interval corresponding to said second time delay and a monostable multivibrator generating said start signal in coincidence with the occurrence of the zero degree crossover of the output from said phase shifter.

9. The converter defined in claim 1, wherein said one of said first and second signals is said first signal, and wherein said predetermined phase of said third signal is the reference phase of said first signal, and wherein said fourth means includes a goniometer compass for indicating azimuth in accordance with the magnitude and polarity of each of two signals applied respectively to first and second inputs thereof, and means for applying said sampled third signal as said first input and said sampled fourth signal as said second input to said goniometer compass.

10. The converter defined in claim 1, wherein said preselected angular value is equal to $n\pi/2$, where $n$ is an integer including zero.

11. The converter defined in claim 10, wherein $n$ is zero.

12. The converter defined in claim 11, wherein said first signal is said one of said first and second signals and said second signal is said other of said first and second signals.

13. The converter defined in claim 1, wherein said third means includes first sampling and holding means for maintaining the magnitude and polarity of each successive sample of said third signal substantially constant until the occurrence of the next subsequent sample of said third signal and second sampling and holding means for maintaining the magnitude and polarity of each successive sample of said fourth signal substantially constant until the next subsequent sample of said fourth signal.

References Cited
UNITED STATES PATENTS

| | | | |
|---|---|---|---|
| 2,258,006 | 10/1941 | Eggers | 343—106 |
| 2,753,556 | 7/1956 | Dickles | 343—106 |
| 2,900,507 | 8/1959 | Rogers. | |
| 3,337,796 | 8/1967 | Hentschel et al. | |

RICHARD A. FARLEY, Primary Examiner

H. C. WAMSLEY, Assistant Examiner

U.S. Cl. X.R.

324—83